(12) United States Patent
Katou

(10) Patent No.: US 9,261,936 B2
(45) Date of Patent: Feb. 16, 2016

(54) NETWORK TERMINAL, METHOD FOR CONTROLLING THE SAME, AND NETWORK SYSTEM

(71) Applicant: Panasonic Corporation, Osaka (JP)

(72) Inventor: Osamu Katou, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 222 days.

(21) Appl. No.: 14/173,148

(22) Filed: Feb. 5, 2014

(65) Prior Publication Data

US 2014/0157023 A1    Jun. 5, 2014

Related U.S. Application Data

(63) Continuation of application No. PCT/JP2012/004552, filed on Jul. 13, 2012.

(30) Foreign Application Priority Data

Aug. 15, 2011    (JP) .................................. 2011-177770

(51) Int. Cl.
    *G06F 1/32*    (2006.01)
    *H04W 52/02*    (2009.01)

(52) U.S. Cl.
    CPC ............ *G06F 1/3206* (2013.01); *G06F 1/3209* (2013.01); *G06F 1/3237* (2013.01);
    (Continued)

(58) Field of Classification Search
    CPC ... G06F 1/3206; G06F 1/3209; G06F 1/3237; Y02B 60/1221
    USPC ........................................................ 713/322
    See application file for complete search history.

(56) References Cited

U.S. PATENT DOCUMENTS

| 8,055,923 B2 | 11/2011 | Kobayashi |
| 8,245,063 B2 * | 8/2012 | Kallam ................. G06F 1/3203 327/99 |

(Continued)

FOREIGN PATENT DOCUMENTS

| JP | 2000-115222 | 4/2000 |
| JP | 2004-234463 | 8/2004 |

(Continued)

OTHER PUBLICATIONS

International Search Report issued Sep. 11, 2012 in corresponding International Application No. PCT/JP2012/004552.

*Primary Examiner* — Vincent Tran
(74) *Attorney, Agent, or Firm* — Wenderoth, Lind & Ponack, L.L.P.

(57) ABSTRACT

A network terminal includes: an oscillator circuit; a communication processing unit which transmits and receives communication data through a transmission path, using the clock; a controller unit which controls a function of the network terminal, using the clock; a clock control unit which causes the oscillator circuit to start or stop oscillating, and supply the clock; and a signal detecting unit which monitors a wave detection signal communicated through the transmission path in the case where the communication processing unit is not operating, and generates an activation signal according to which the clock control unit causes the oscillator circuit to start oscillating at a time when the wave detection signal exceeds a threshold value. The signal detecting unit is operable without using the clock, and the controller unit switches a detectable wave detection signal by changing a circuit constant of the signal detecting unit.

17 Claims, 15 Drawing Sheets

(52) U.S. Cl.
CPC ......... *G06F1/3278* (2013.01); *H04W 52/0229*
(2013.01); *Y02B 60/126* (2013.01); *Y02B*
*60/1221* (2013.01); *Y02B 60/50* (2013.01)

(56) References Cited

U.S. PATENT DOCUMENTS

| | | | | |
|---|---|---|---|---|
| 8,755,291 B2* | 6/2014 | Fang | ...................... | H04L 12/10 370/252 |
| 2002/0199026 A1* | 12/2002 | Tsunashima | .......... | G06F 1/3203 709/250 |
| 2005/0188232 A1* | 8/2005 | Weng | .................... | G06F 1/3203 713/320 |
| 2009/0070608 A1 | 3/2009 | Kobayashi | | |
| 2009/0249098 A1* | 10/2009 | Han | ...................... | G06F 1/3203 713/322 |
| 2010/0165865 A1* | 7/2010 | Fang | ...................... | H04L 12/10 370/252 |
| 2012/0106363 A1* | 5/2012 | Diab | ...................... | H04L 12/12 370/252 |

FOREIGN PATENT DOCUMENTS

| | | |
|---|---|---|
| JP | 2005-286745 | 10/2005 |
| JP | 2006-279821 | 10/2006 |
| JP | 2007-259339 | 10/2007 |
| JP | 2009-70093 | 4/2009 |
| JP | 2010-193126 | 9/2010 |

* cited by examiner

FIG. 11A

| | Voltage condition for detection signal (Reference voltage value) | Frequency condition for detection signal |
|---|---|---|
| Terminal A (Network terminal 300) | $V_A$ | Lower than $f_A$ |
| Terminal B (Network terminal 300) | $V_B$ | Lower than $f_B$ |
| Terminal C (Network terminal 100) | $V_C$ | Lower than $f_C$ |
| Terminal D (Network terminal 100) | $V_D$ | Lower than $f_D$ |

FIG. 11B

| Normal communication signal | Condition for data signal (Voltage value) | Carrier wave frequency |
|---|---|---|
| For all terminals | $V_{com}$ | $f_{com}$ |

FIG. 12A

| | Voltage condition for detection signal (Reference voltage value) | Frequency condition for detection signal |
|---|---|---|
| Terminal A (Network terminal 300) | V1 | Lower than f1 |
| Terminal B (Network terminal 300) | V1 | Lower than f2 |
| Terminal C (Network terminal 100) | V2 | Lower than f3 |
| Terminal D (Network terminal 100) | V3 | Lower than f3 |

FIG. 12B

| Normal communication signal | Condition for data signal (Voltage value) | Carrier wave frequency |
|---|---|---|
| For all terminals | V3 | f1 |

FIG. 13

| | Voltage condition for detection signal (Reference voltage value) | Frequency condition for detection signal |
|---|---|---|
| Terminal A (Network terminal 300) | V1 | Lower than f2 |
| Terminal B (Network terminal 300) | V2 | Lower than f1 |
| Terminal C (Network terminal 100) | V4 | Lower than f3 |
| Terminal D (Network terminal 100) | V4 | Lower than f3 |

FIG. 14

| | Voltage condition for detection signal (Reference voltage value) | Frequency condition for detection signal |
|---|---|---|
| Terminal A (Network terminal 300) | V2 | Lower than f2 |
| Terminal B (Network terminal 300) | V1 | Lower than f1 |
| Terminal C (Network terminal 100) | V4 | Lower than f4 |
| Terminal D (Network terminal 100) | V5 | Lower than f5 |

NETWORK TERMINAL, METHOD FOR CONTROLLING THE SAME, AND NETWORK SYSTEM

CROSS REFERENCE TO RELATED APPLICATIONS

This is a continuation application of PCT International Application No. PCT/JP2012/004552 filed on Jul. 13, 2012, designating the United States of America, which is based on and claims priority of Japanese Patent Application No. 2011-477770 filed on Aug. 15, 2011. The entire disclosures of the above-identified applications, including the specifications, drawings and claims are incorporated herein by reference in their entirety.

FIELD

One or more exemplary embodiments disclosed herein relate generally to network terminals, methods for controlling the same, and network systems, and relates particularly to a network terminal which communicates through a transmission path, a method for controlling the same, and a network system including the same.

BACKGROUND

There are network apparatuses such as battery-driven mobile devices, coping machines which uses long waiting time, and network audio visual (AV) devices. Recent years have seen increasing demands for saving power to be consumed by these network apparatuses.

Conventionally, WAKE ON LAN has been known as a technique for saving power using a network. This power saving technique has been widely utilized as a scheme for causing a given device to transition from a waiting mode (waiting state) to a normal operation mode (normal operation state), using a data signal which is referred to as a magic packet.

For example, Patent Literature 1 reports such a power saving technique for causing a given device to transition from a waiting mode to a normal operation mode. Patent Literature 1 discloses a scheme for causing a device to transition from a waiting mode to a normal operation mode when a data pattern of a packet received through a network matches any one of a plurality of preset data patterns.

CITATION LIST

Patent Literature
[PTL 1]
Japanese Unexamined Patent Application Publication No, 2006-279821

SUMMARY

Technical Problem

However, the conventional technique requires that an activation signal which triggers a return from a waiting mode is monitored, and that circuits for decoding and analyzing (comparing and matching) received packets always need to be operating. For this reason, an oscillator circuit always needs to be operating for supply of a clock to at least a communication processing unit including the circuits for decoding etc. Thus, it is impossible to sufficiently reduce electric power to be consumed in a network terminal.

In view of this, non-limiting and exemplary embodiments disclosed herein provide a network terminal which consumes very little electric power in a waiting mode, a method for controlling the same, and a network system including the same.

Solution to Problem

In one general aspect, the techniques disclosed here feature a network terminal which performs communication through a transmission path, including: an oscillator circuit which generates a clock; a communication processing unit configured to transmit and receive communication data through the transmission path, using the clock; a controller unit configured to control a function of the network terminal, using the clock; a clock control unit configured to cause the oscillator circuit to start or stop oscillating, and supply the clock generated by the oscillator circuit to the communication processing unit and the controller unit; and a signal detecting unit configured to monitor a wave detection signal communicated through the transmission path in a case where the communication processing unit is not operating, and generate an activation signal according to which the clock control unit causes the oscillator circuit to start oscillating at a time when the wave detection signal exceeds a threshold value, wherein the signal detecting unit is configured with a circuit operable without using the clock, and the controller unit is configured to switch a wave detection signal detectable by the signal detecting unit, by changing a circuit constant of the signal detecting unit.

With this structure, the network terminal consumes very little electric power in a waiting mode.

Here, the case where the communication processing unit is not operating may be a case where the oscillator circuit at least keeps generating a low-frequency clock which does not activate the communication processing unit.

In addition, the signal detecting unit may be configured to output the activation signal to the clock control unit and the controller unit, the clock control unit may be configured to cause, according to the activation signal, the oscillator circuit to start generating a clock having a frequency at which at least the communication processing unit is operable, and supply the clock generated by the oscillator circuit to the communication processing unit and the controller unit, and after start of supply of the clock, the controller unit may be configured to perform operation mode control on the network terminal according to the activation signal so that the network terminal transitions from a waiting mode to a normal operation mode, the waiting mode being an operation mode in which the oscillator circuit at least keeps generating the low-frequency clock which does not activate the communication processing unit, the normal operation mode being an operation mode in which the oscillator circuit operates and the communication data can be communicated.

With this structure, the network terminal keeps in the waiting mode (non-stop mode) in which the oscillator circuit keeps generating the clock having a low frequency which does not activate at least the communication processing unit and thus the communication processing unit is not operating, and the network terminal can return to the normal operation mode for performing communication processing only when the network terminal detects the signal which matches the detection conditions preset for the signal detecting unit.

Alternatively, when the communication processing unit is not operating, the oscillator circuit may be at least stopped.

In addition, the signal detecting unit may be configured to output the activation signal to the clock control unit and the controller unit, the clock control unit may be configured to cause, according to the activation signal, the oscillator circuit to start oscillating, and supply the clock generated by the oscillator circuit to the communication processing unit and the controller unit, and after start of supply of the clock, the controller unit may be configured to perform operation mode control on the network terminal according to the activation signal so that the network terminal transitions from a stop mode to a normal operation mode, the stop mode being an operation mode in which the oscillator circuit is at least stopped, the normal operation mode being an operation mode in which the oscillator circuit operates and the communication data can be communicated.

With this structure, the network terminal can normally stop the oscillator circuit and keep the stop mode in which very little electric power is consumed, and can return to the normal operation mode for performing communication processing only when the network terminal detects the signal which matches the detection conditions preset for the signal detecting unit.

in addition, the signal detecting unit may include a comparator which is configured with a circuit operable without using the clock, and compares the wave detection signal with the threshold value to determine whether the wave detection signal exceeds the threshold value or not, and the controller unit may be configured to switch a wave detection signal detectable by the signal detecting unit, by changing a threshold voltage to be provided to the comparator so as to change the threshold value.

In addition, the signal detecting unit may include: a wave detector circuit which is configured with a circuit operable without using the clock, and detects the wave detection signal; and a comparator which is configured with a circuit operable without using the clock, and compares the wave detection signal with the threshold value to determine whether the wave detection signal exceeds the threshold value or not, and the controller unit is configured to switch a wave detection signal detectable by the signal detecting unit, by changing charge and discharge characteristics of the wave detector circuit.

In addition, the signal detecting unit may include: a wave detector circuit which is configured with a circuit operable without using the clock, and detects the wave detection signal; a comparator which may be configured with a circuit operable without using the clock, and compares the wave detection signal with the threshold value to determine whether the wave detection signal exceeds the threshold value or not; and a filter circuit which may be configured with a circuit operable without using clock, and has a filter characteristic of allowing a signal having a predetermined frequency to pass through, and the controller unit may switch a wave detection signal detectable by the signal detecting unit by changing the filter characteristic of the filter circuit.

Furthermore, the network terminal may further include an activation signal control unit configured to generate the activation signal independently, wherein the activation signal control unit: may include one of an external interrupt circuit, a timer, a serial interface, and a sensor IF circuit; and may be configured to generate the activation signal triggered by one of an input signal from an external device, an end of a count by the timer, an ambient temperature, and a vibration, the communication processing unit may be configured to transmit, through a transmission path, a wave detection signal to other network terminals connected through the transmission path, and the controller unit may be configured to cause the communication processing unit to transmit the wave detection signal which is detectable by a particular one of the other network terminals, by changing a waveform or a frequency of the detection signal transmitted by the communication processing unit.

With this structure, the network terminal can keep the waiting mode in which very little electric power is normally used, and transition to the normal processing mode for performing communication processing, based on a count by the timer or information from a sensor provided in the terminal. In addition, after the return to the normal operation mode, it is possible to output a target waveform by switching the settings of the communication processing unit.

In addition, the communication processing unit may include a D/A converter as a transmitter circuit, and the controller unit may be configured to change a signal amplitude or a carrier wave frequency of the wave detection signal to be transmitted by the communication processing unit, by changing an input value to the D/A converter.

In addition, the communication processing unit may include an amplifier (AMP) circuit as a transmitter circuit, and the controller unit may be configured to change the signal amplitude of the wave detection signal to be transmitted by the communication processing unit, by changing an amplitude rate of the AMP circuit.

In addition, the communication processing unit may include a sine wave generator circuit as a transmitter circuit, and the controller unit may be configured to change a carrier wave frequency of the wave detection signal to be transmitted by the communication processing unit, by changing a frequency of the sine wave generator circuit.

In addition, the controller unit may be configured to perform operation mode control for causing the network terminal to transition to the stop mode in the case where no communication data has been transmitted or received over a certain period of time in the normal operation mode.

In addition, the controller unit may be configured to perform operation mode control for causing the network terminal to transition to the stop mode or a power saving mode in the case where the controller unit receives, in the normal operation mode, a data signal indicating a transition request from an other one of the network terminals connected through the transmission path, the transition request requesting that the network terminal transition to the waiting mode.

With this structure, in the waiting mode, the network terminal can return to the normal operation mode in response to the request from the other terminal connected to the network, and return to the normal operation mode based on an event occurred internally in the terminal. The waiting mode may be the stop mode as necessary, or may be the power saving mode for performing only essential functions using a reduced clock frequency. In addition, after the transition to the normal operation mode, it is possible to output the target waveform.

In addition, with this structure, the network terminal can return to the waiting mode again even after it once transitions to the normal operation mode.

In one general aspect, the techniques disclosed here feature a network terminal which performs communication through a transmission path, including: an oscillator circuit which generates a clock; a communication processing unit configured to transmit and receive communication data through the transmission path, using the clock; a controller unit configured to control a function of the network terminal, using the clock; a clock control unit configured to cause the oscillator circuit to start or stop oscillating, and supply the clock generated by the oscillator circuit to the communication processing unit and the controller unit; and a signal detecting unit configured to monitor a wave detection signal communicated through the transmission path in a case where the communication processing unit is not operating, and generate an activation signal according to which the dock control unit causes the oscillator circuit to start oscillating at a time when the wave detection signal exceeds a threshold value, wherein the signal detecting unit is configured with a circuit operable without using the clock, and the controller unit is configured to switch a wave detection signal detectable by the signal detecting unit, by changing a circuit constant of the signal detecting unit.

It is to be noted that general and specific aspects disclosed above can be made not only as the terminal device, but also as an integrated circuit including the same processing units as in the terminal device, as a method including the steps corresponding to the processing units of the terminal device, and/or as others such as a system. Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

One or more exemplary embodiments or features disclosed herein provide a network terminal which consumes very little electric power in a waiting mode, a method for controlling the same, and a network system including the same.

For example, it is possible to keep a state in which a network terminal or an entire network system consumes very little electric power in a waiting mode in which no communication is made. For example, even when a data communication event arises in a network system, it is possible to selectively cause only a target network terminal to return from a waiting mode without causing a return of a terminal unrelated to the data communication. In this way, the present disclosure provides an advantageous effect of being able to realize an effective power control in the entire network system.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 11A is a diagram showing conditions for signals which are set initially for the respective network terminals in the network system according to Embodiment 3.

FIG. 11B is a diagram showing conditions for signals which are set initially for the respective network terminals in the network system according to Embodiment 3.

FIG. 12A is a diagram showing conditions for signals which are set initially for the respective network terminals in the network system according to Embodiment 3.

FIG. 12B is a diagram showing conditions for signals which are set initially for the respective network terminals in the network system according to Embodiment 3.

FIG. 13 is a diagram showing conditions for wave detection signals which are set initially for the respective network terminals in the network system according to Embodiment 3.

FIG. 14 is a diagram showing conditions for wave detection signals which are set initially for the respective network terminals in the network system according to Embodiment 3.

DESCRIPTION OF EMBODIMENTS

Hereinafter, one or more non-limiting exemplary embodiments are described with reference to the drawings.

Embodiment 1

Figure 1:
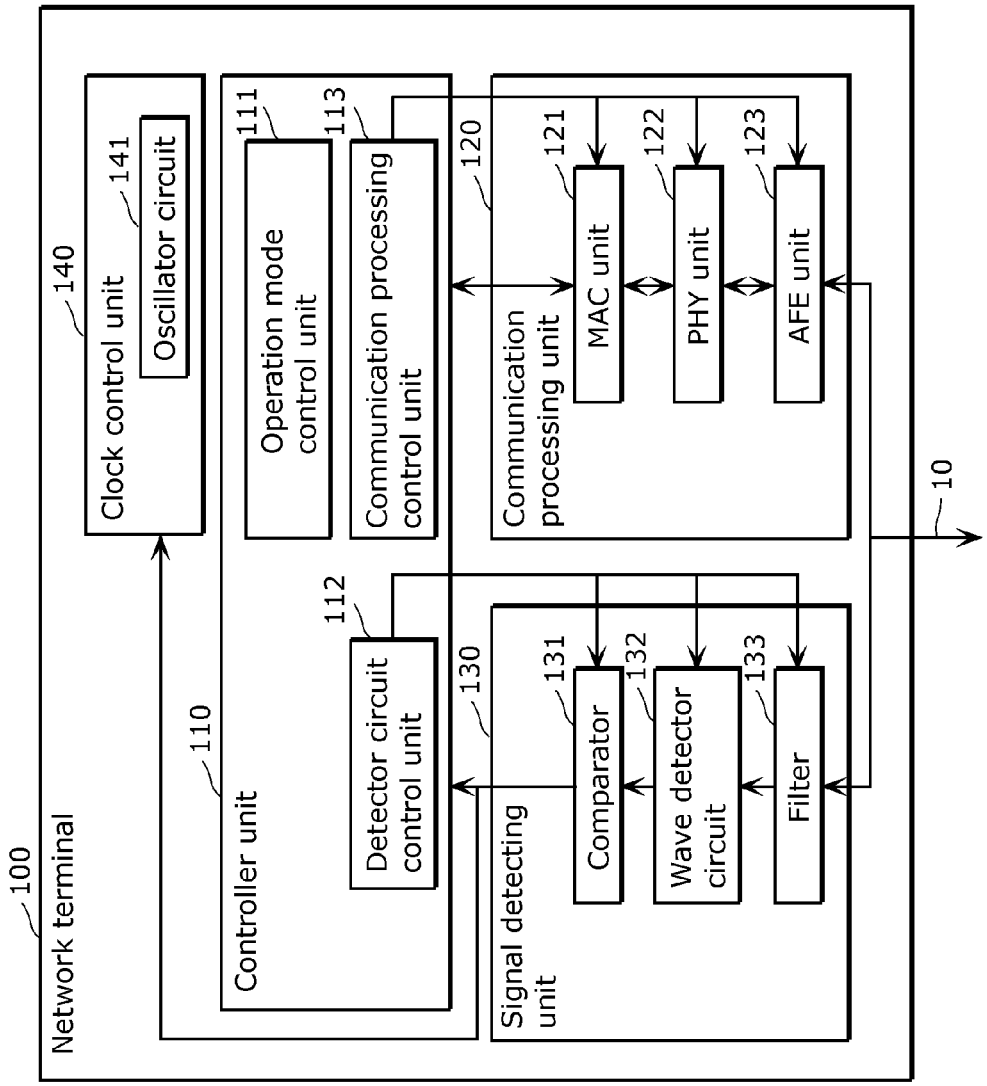
FIG. 1 is a block diagram showing a schematic structure of a network terminal according to Embodiment 1 of the present disclosure.

FIG. 1 is a block diagram showing a schematic structure of a network terminal 100 according to Embodiment 1 of the present disclosure.

The network terminal 100 in FIG. 1 is a network terminal which communicates through a transmission path 10, and includes a controller unit 110, a communication processing unit 120, a signal detecting unit 130, and a clock control unit 140.

The clock control unit 140 includes an oscillator circuit 141 which generates a clock. The clock control unit 140 causes the oscillator circuit 141 to start or stop oscillating, and supplies the clock generated by the oscillator circuit 141 to the communication processing unit 120 and the controller unit 110. In addition, the clock control unit 140 causes the oscillator circuit 141 to start oscillating according to an activation signal, and supplies the clock generated by the oscillator circuit 141 to the communication processing unit 120 and the controller unit 110.

More specifically, the clock control unit 140 receives an instruction from the signal detecting unit 130 or an operation mode control unit 111, and, for example, changes a frequency of the clock to be supplied to the controller unit 110 and the communication processing unit 120, or performs ON/OFF controls for supply of the clock.

The communication processing unit 120 transmits and receives communication data through the transmission path 10, using the clock generated by the oscillator circuit 141.

More specifically, the communication processing unit 120 includes a media access control (MAC) unit 121, a physical layer (PHY) unit 122, and an analog front end (AFE) unit 123.

The MAC unit 121 performs, for example, processes of framing the communication data to be transmitted, detecting an error, encrypting the communication data. The PHY unit 122 performs, for example, processes of detecting a signal showing the communication data to be received, and modulating and demodulating the signal showing the communication data to be transmitted and received. The AFE unit 123 performs, for example, processes of filtering and amplification of the signal showing the communication data to be received, and waveform formation.

The controller unit 110 controls a function of the network terminal 100 using the clock generated by the oscillator circuit 141.

For example, the controller unit 110 changes a circuit constant of the signal detecting unit 130, and switches a wave detection signal which is detectable by the signal detecting unit 130.

In addition, after a start of supply of the clock generated by the oscillator circuit 141, the controller unit 110 performs operation mode control on the network terminal 100 according to the activation signal so that the network terminal 100 transitions from a stop mode in which the oscillator circuit 141 is at least stopped to a normal operation mode in which the oscillator circuit 141 operates and communication data can be transmitted and received. In addition, in the case where no communication data is communicated over a certain period of time when the network terminal 100 is in a normal operation mode, the controller unit 110 performs operation mode control on the network terminal 100 so that the network terminal 100 transitions to a waiting mode such as a stop mode or a non-stop mode. In addition, the controller unit 110 performs operation mode control on the network terminal 100 so that the network terminal 100 transitions to the waiting mode such as the stop mode or the non-stop mode in the case where the controller unit 110 receives a data signal showing a transition request for the network terminal 100 in the normal operation mode from an other network terminal connected through the transmission path 10.

More specifically, the controller unit 110 includes an operation mode control unit 111, a detector circuit control unit 112, and a communication processing control unit 113.

The operation mode control unit 111 switches operation modes of the network terminal 100, based on the activation signal output from the signal detecting unit 130 and the communication data received through the transmission path 10. Here, the operation modes of the network terminal 100 are classified into the normal operation mode and waiting modes, and the waiting modes includes the stop mode and the non-stop mode.

The normal operation mode is one of the operation modes of the network terminal 100 and in which the oscillator circuit 141 operates and communication data can be communicated as described above. The waiting modes among the operation modes of the network terminal 100 uses smaller electric power to be consumed compared to the normal operation mode. In the stop mode, the oscillator circuit 141 is at least stopped as described above, and thus electric power which is consumed by the network terminal 100 is almost zero. The non-stop mode is the other one of the waiting modes among the operation modes. In the non-stop mode, the oscillator circuit 141 is at least operating, and thus a clock generated by the oscillator circuit 141 is being supplied to some of the functional units of the network terminal 100. For example, in the non-stop mode, the oscillator circuit 141 keeps generating a slow (low frequency) clock which does not activate the communication processing unit 120.

The detector circuit control unit 112 sets a circuit constant for the signal detecting unit 130. Details for this will be described later, and not provided here.

For the communication processing unit 120, the communication processing control unit 113 performs, through the transmission path 10, various kinds of initial settings of address information etc. necessary for communication with another network terminal, generation of data to be transmitted, and analysis of the data received through the transmission path.

Here, the controller unit 110 may include a random access memory (RAM), a read only memory (ROM), and/or the like. In addition, the controller unit 110 may include other peripheral functions such as a timer.

The signal detecting unit 130 is configured with a circuit operable without using any clock which is generated by the oscillator circuit 141. When the communication processing unit 120 is not operating, the signal detecting unit 130 monitors a wave detection signal communicated through the transmission path 10, and when the detected wave detection signal exceeds a threshold value, generates an activation signal according to which the clock control unit 140 causes the oscillator circuit 141 to start oscillating. The signal detecting unit 130 outputs the generated activation signal to the clock control unit 140 and the controller unit 110.

More specifically, the signal detecting unit 130 includes a comparator 131, a wave detector circuit 132, and a filter 133. It is to be noted that the filter 133 is not an essential element. In other words, the signal detecting unit 130 does not always need to include the filter 133.

The filter 133 is an example of a filter circuit for use in the present disclosure. The filter 133 is configured with a circuit operable without using any clock which is generated by the oscillator circuit 141 and has a filtering characteristic for allowing signals of a predetermined frequency to pass through. The filtering characteristic of the filter 133 is changed by the controller unit 110. More specifically, the filter 133 removes a signal of a particular frequency band when receiving a signal from the transmission path 10. The filter 133 is configured as an RC filter or the like, and is capable of switching transmission characteristics for an input signal by means of the controller unit 110 changing a resistance-value constant or a capacitance-value constant which is a circuit constant.

The wave detector circuit 132 is an example of a filter circuit for use in the present disclosure. The filter 133 is configured with a circuit operable without using any clock which is generated by the oscillator circuit 141, and detects a detection signal.

Figure 2:
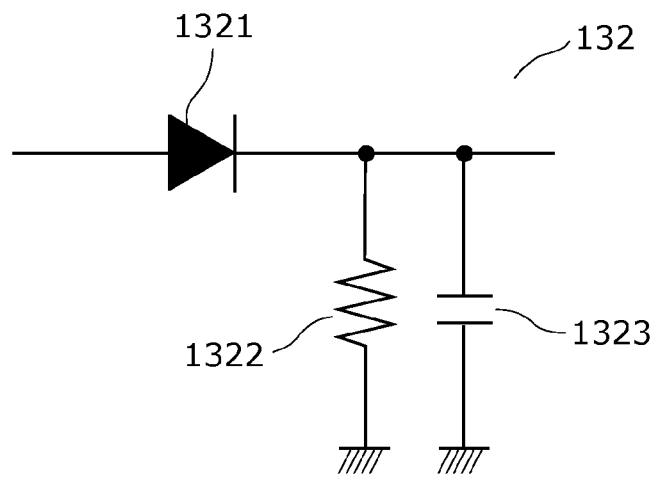
FIG. 2 is a diagram showing an example of a structure of a wave detector circuit according to Embodiment 1.
Figure 3:
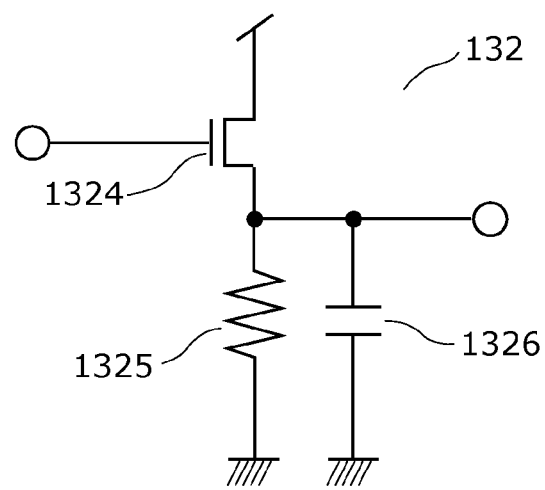
FIG. 3 is a diagram showing an example of a structure of a wave detector circuit according to Embodiment 1.

Each of FIG. 2 and FIG. 3 is a diagram showing an example of a structure of a wave detector circuit according to Embodiment 1.

The wave detector circuit 132 is configured to include, for example, a diode 1321, a resistor 1322, and a capacitor 1323 as shown in FIG. 2, and detects an envelop of a wave without using any clock which is generated by the oscillator circuit 141. Here, it is possible to change charge and discharge characteristics of the wave detector circuit 132 by means of the controller unit 110 changing the resistance-value constant of the resistor 1322 or the capacitance-value constant of the capacitor 1323. In this way, it is possible to switch detection signals detectable by the signal detecting unit 130.

In addition, the wave detector circuit 132 may be configured to include a transistor 1324, a resistor 1325, and a capacitor 1326 as shown in FIG. 3. In this case, it is possible to change charge and discharge characteristics of the wave detector circuit 132 by means of the controller unit 110 changing the resistance-value constant of the resistor 1325 or the capacitance-value constant of the capacitor 1326.

It is to be noted that the structure of the wave detector circuit 132 is not limited to the one shown in FIG. 2 or FIG. 3. The wave detector circuit 132 may be configured with a circuit operable without using any clock which is generated by the oscillator circuit 141 and capable of detecting (the wave of) the input signal through the transmission path 10.

The comparator 131 is an example of a comparator for use in the present disclosure. The comparator 131 is configured with a circuit operable without using any clock which is generated by the oscillator circuit 141, and compares a detection signal with a threshold value to determine whether the detection exceeds the threshold value.

Here, it is possible to change the threshold value by means of the controller unit 110 changing a threshold voltage to be provided to the comparator 131. In this way, it is possible to switch detection signals detectable by the signal detecting unit 130.

More specifically, the comparator 131 compares a charge voltage value of the wave detector circuit 132 with a preset reference voltage value, and outputs the comparison result. The comparator 131 is, for example, a comparator configured to switch an amplification value (wave detection signal) detectable by the signal detecting unit 130 by means of the controller unit 110 changing the reference voltage value to be input to the comparator.

It is possible to switch the wave detection signal detectable by the signal detecting unit 130 by means of the controller unit 110 changing a circuit constant etc. of the signal detecting unit 130. This is specifically described below.

Figure 4:
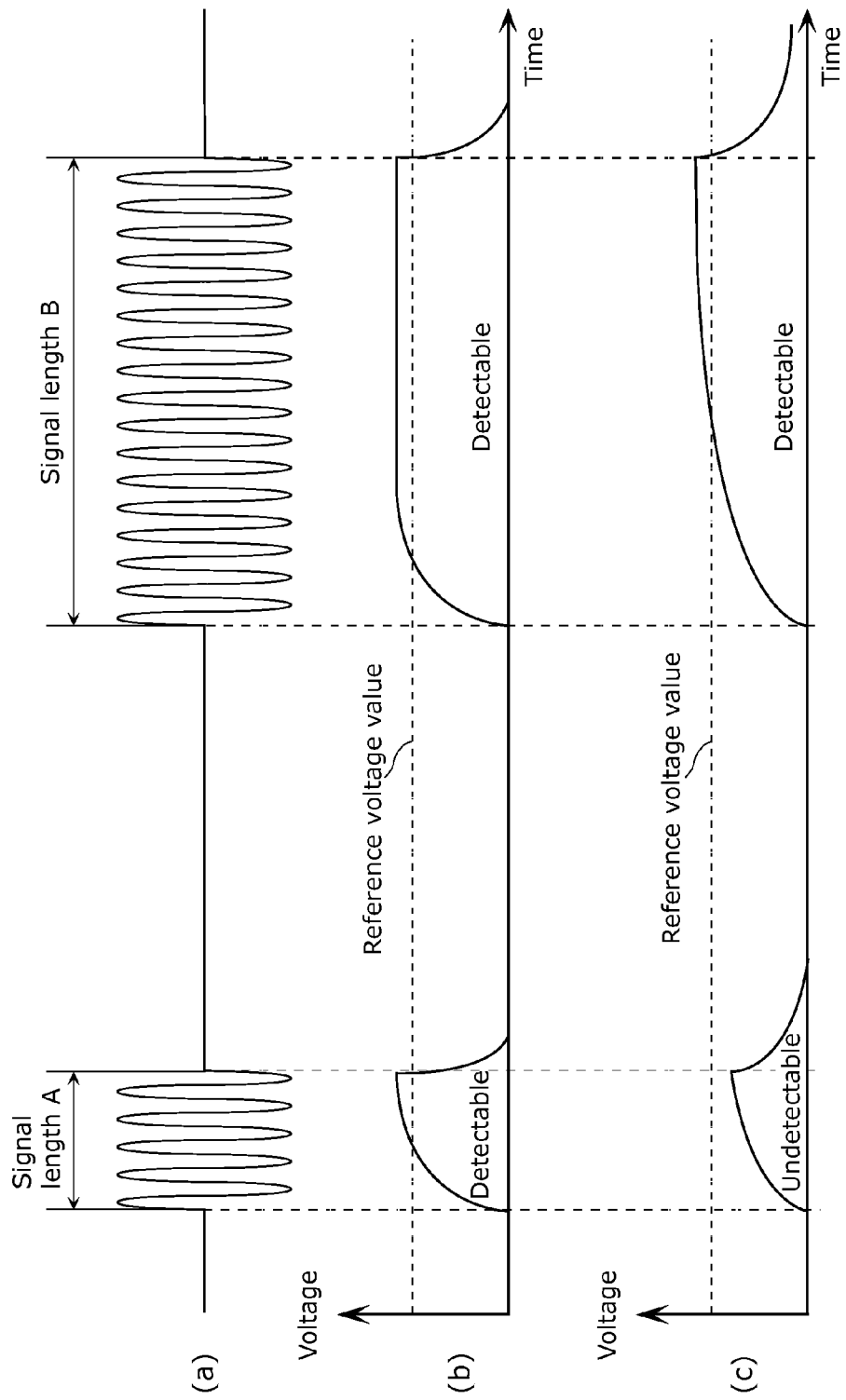
FIG. 4 is a diagram showing an example of an operation of detecting a wave detection signal in the case where charge and discharge characteristics of an oscillator circuit are changed according to Embodiment 1.

FIG. 4 is a diagram showing an example of an operation of detecting a (wave detection) signal in the case where charge and discharge characteristics of the wave detector circuit 132 are changed in Embodiment 1. It is assumed here that the wave detector circuit 132 receives, through the transmission path 10, inputs of signals having different signal lengths (signal lengths A and B) as shown in (a) of FIG. 4. It is also assumed that the reference voltage value provided to the comparator 131 is constant (the threshold value is constant).

In FIG. 4, (b) shows an example of a detection operation performed in the case where the wave detector circuit 132 has predetermined charge and discharge characteristics, and (c) shows an example of a detection operation performed in the case where the wave detector circuit 132 has charge and discharge characteristics different from those in (b).

The (b) and (c) of FIG. 4 show that it possible to determine whether each of wave detection signals is detectable or not based on the signal length thereof even if the signals have the same carrier frequencies and amplitudes, by changing the charge and discharge characteristics.

Figure 5:
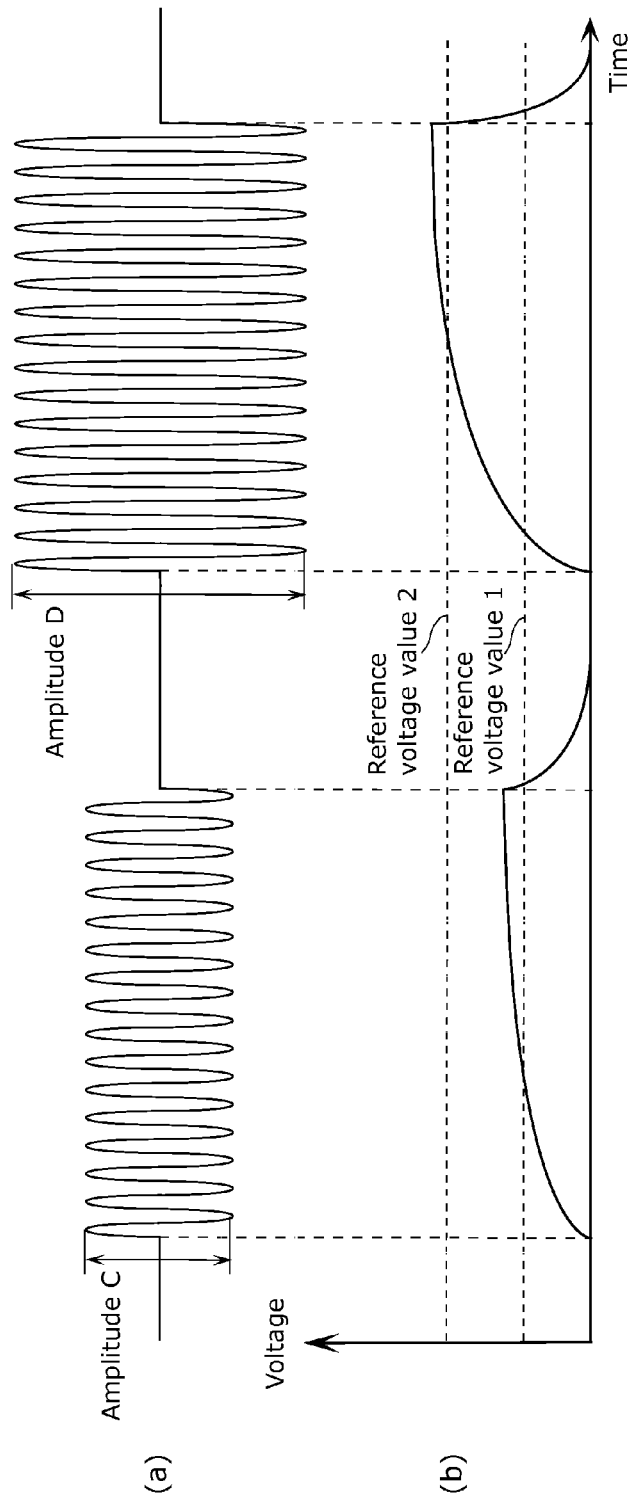
FIG. 5 is a diagram showing an example of an operation of detecting a wave detection signal in the case where reference voltage values of a comparator are changed according to Embodiment 1.

FIG. 5 is a diagram showing an example of an operation of detecting a (wave detection) signal in the case where reference voltage values of the comparator 131 are changed in Embodiment 1. It is assumed here that the wave detector circuit 132 receives, through the transmission path 10, inputs of signals having different amplitudes (amplitudes C and D) as shown in (a) of FIG. 5. It is also assumed here that the charge and discharge characteristics of the wave detector circuit 132 are constant.

In FIG. 5, (b) shows an example of a detection operation in the case where reference voltage values (reference voltage values 1 and 2) to be provided to the comparator 131.

As shown in (b) of FIG. 5, even if the signals have the same signal lengths and carrier frequencies, use of different reference voltage values makes it possible to determine whether each of wave detection signals is detectable or not, based on the amplitude determined according to the reference voltage value for the wave detection signal.

In this way, it is possible to switch the wave detection signal detectable by the signal detecting unit 130 by means of the controller unit 110 changing a circuit constant etc. of the signal detecting unit 130.

Accordingly, the signal detecting unit 130 is configured to include the comparator 131, the wave detector circuit 132, and the filter 133 which operate without using any clock generated by the oscillation circuit 141, and thus operates with very little power consumption.

The network terminal 100 is configured as described above.

Next, operations performed by the network terminal 100 are described.

First, the network terminal 100 is subject to initial settings performed by the controller unit 110. More specifically, the communication processing control unit 113 performs settings of network information to the communication processing unit 120. At the same time, the detector circuit control unit 112 performs settings of circuit constants etc. of the filter 133, the wave detector circuit 132, and the comparator 131 which are included in the signal detecting unit 130, and thereby performs, in advance, settings of conditions (frequency bands, signal amplitudes, and signal lengths) of signals (wave detection signals and data signals) detectable by the signal detecting unit 130.

It is to be noted that the controller unit 110 may cause the communication processing unit 120 to notify a network terminal connected through the transmission path 10 of the details of the initial settings.

Next, the network terminal 100 performs a process of communicating communication data through the transmission path 10 using a dock generated by the oscillator circuit 141, after the completion of the initial settings.

Next, the network terminal 100 controls a function of the connected network terminal using the clock generated by the oscillator circuit 141.

More specifically, the controller unit 110 switches operation modes of the network terminal 100, based on input signals (a wave detection signal and a data signal) received from the connected network terminal.

For example, it is assumed that the network terminal 100 received the data signal which shows an instruction for a transition to a waiting mode from the connected network terminal, or that a certain period of time without any communication was elapsed after the reception of the signals including the data signal. In this case, the operation mode control unit 111 causes the network terminal 100 to transition to the stop mode. In this way, the network terminal 100 can transition to and maintain a state in which very little electric power is consumed.

Here, the signal detecting unit 130 operable even in the stop mode can receive signals through the transmission path 10.

Next, when the network terminal 100 is, for example, in the stop mode in which the oscillator circuit 141 does not oscillate, the signal detector unit 130 monitors a detection signal which is communicated through the transmission path 10, and generates an activation signal for causing the oscillator circuit 141 to start oscillating when the detection signal exceeds a threshold value.

More specifically, the signal detecting unit 130 generates the activation signal and outputs it to the clock control unit 140 when the signal received through the transmission path 10 matches a condition for a (wave detection) signal preset as a condition for a detectable signal. In addition, this activation signal is output also to the controller unit 110.

Next, according to the activation signal, the clock control unit 140 causes the oscillator circuit 141 to start oscillating and supplies a clock generated by the oscillator circuit 141.

More specifically, the clock control unit 140 causes the oscillator circuit 141 to re-start operation, and supplies the clock generated by the oscillator circuit 141 to the controller unit 110 and the communication processing unit 120.

At the same time, the operation mode control unit 111 causes the network terminal 100 to transition to the normal operation mode.

In this way, with the signal detecting unit 130 which operates without using any clock which is generated by the oscillator circuit 141, the network terminal 100 can selectively detect the signal received through the transmission path 10, and thus can transition from the waiting mode (stop mode) in which very little electric power is consumed to the normal operation mode in which a communication process can be performed.

In other words, according to this embodiment, it is possible to continue the state (stop mode) in which very little electric power is consumed in the entire network terminal 100 during the waiting mode in which no communication processing is performed, and to return from the waiting mode when the need for a communication process etc. arises.

In this way, it is possible to realize a network terminal which consumes very little electric power in the waiting mode.

In this embodiment, the circuit constant of the signal detecting unit is changed by the controller unit 110. However, this is a non-limiting example. Alternatively, the circuit constant may be switched according to a data signal or the like from another network terminal connected through the transmission path 10.

In addition, although the state (stop mode) in which very little electric power is consumed in the entire network terminal 100 is maintained in the waiting mode in which no communication process is performed, the state is a non-limiting example. Alternatively, a waiting mode (non-stop mode) may be maintained in which the oscillator circuit 141 keeps generating a slow (low-frequency) clock which does not activate the communication processing unit 120.

Figure 6:
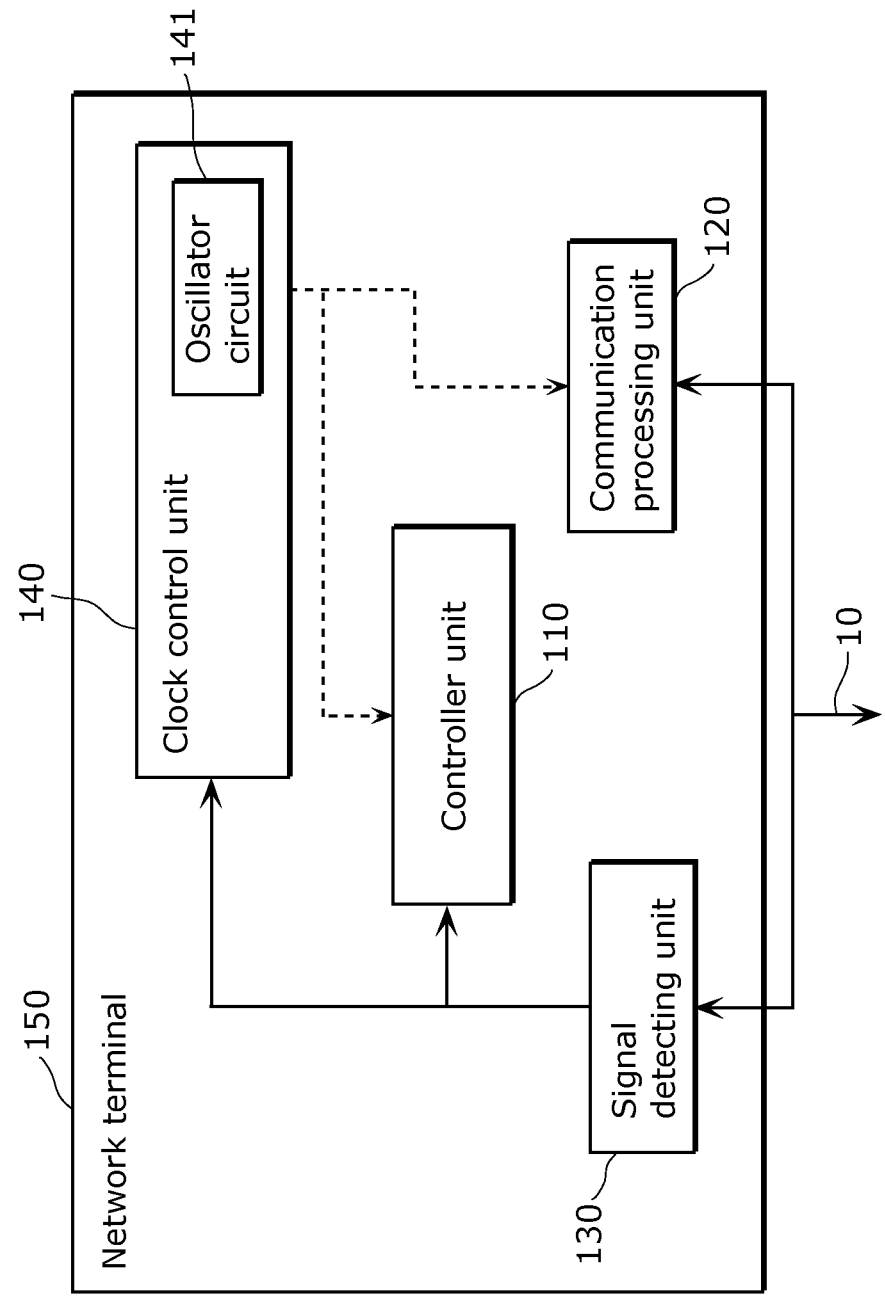
FIG. 6 is a block diagram showing a minimum structure of the network terminal in the present disclosure.

In addition, the structure of the network terminal 100 in this embodiment is not limited to the one described above. As shown in FIG. 6, the network terminal 150 may include the controller unit 110, the communication processing unit 120, the signal detecting unit 130, and the clock control unit 140. Here, FIG. 6 is a block diagram showing a minimum structure of the network terminal in the present disclosure. It is to be noted that the same structural elements as in FIG. 1 are assigned with the same numerical references, and detailed descriptions thereof are not repeated here.

When the oscillator circuit 141 includes the signal detecting unit 130 which operates without using any clock generated by the oscillator circuit 141, it is possible to realize the network terminal which consumes very little electric power during the waiting mode.

Figure 7:
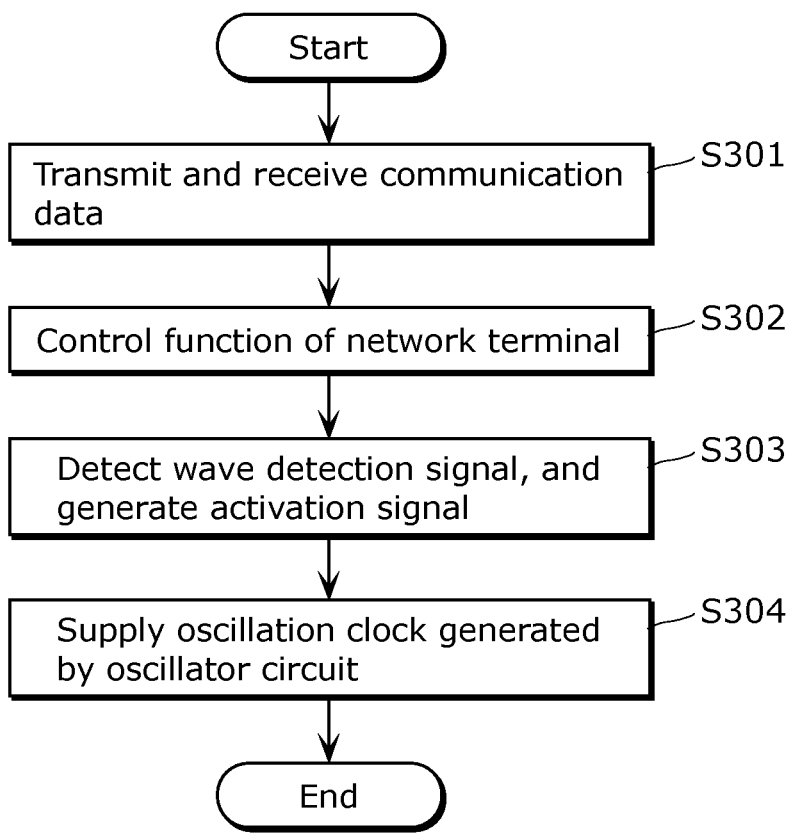
FIG. 7 is a diagram for explaining an operation by the network terminal shown in FIG. 6.

FIG. 7 is a diagram for explaining an operation by the network terminal shown in FIG. 6. Operations performed by the network terminal 150 configured as shown in FIG. 6 are described with reference to FIG. 7.

First, the network terminal 100 is subject to initial settings performed by the controller unit 110.

After the completion of the initial settings of the network terminal 150, the communication processing unit 120 transmits and receives communication data through the transmission path 10 (S301).

Next, in the network terminal 150, the controller unit 110 controls a function of the network terminal using the clock generated by the oscillator circuit 141 (S302). For example, the controller unit 110 changes, as the function, a circuit constant of the signal detecting unit 150, and switches a wave detection signal which is detectable by the signal detecting unit 130.

Next, when the network terminal 100 is, for example, in the stop mode in which the oscillator circuit 141 does not oscillate, the signal detecting unit 130 monitors a detection signal which is communicated through the transmission path 10, and generates an activation signal for causing the oscillator circuit 141 to start oscillating when the detection signal exceeds a threshold value (S303). Here, the signal detecting unit 130 is capable of operating without using any clock generated by the oscillator circuit 141.

Next, according to the activation signal, the dock control unit 140 causes the oscillator circuit 141 to start oscillating and supplies a clock generated by the oscillator circuit 141 (S304).

At the same time, the controller unit 110 causes the network terminal 150 to transition to the normal operation mode.

The network terminal 150 is configured as described above.

Embodiment 2

In Embodiment 1, the network terminal has been described which includes the signal detecting unit 130 and thereby is capable of detecting a wave detection signal and returning (activating) using a very little electric power in any one of the waiting modes. In Embodiment 2, a description is given of a network terminal which transmits a signal (wave detection signal) for causing the network terminal in Embodiment 1 to return from any one of waiting modes.

Figure 8:
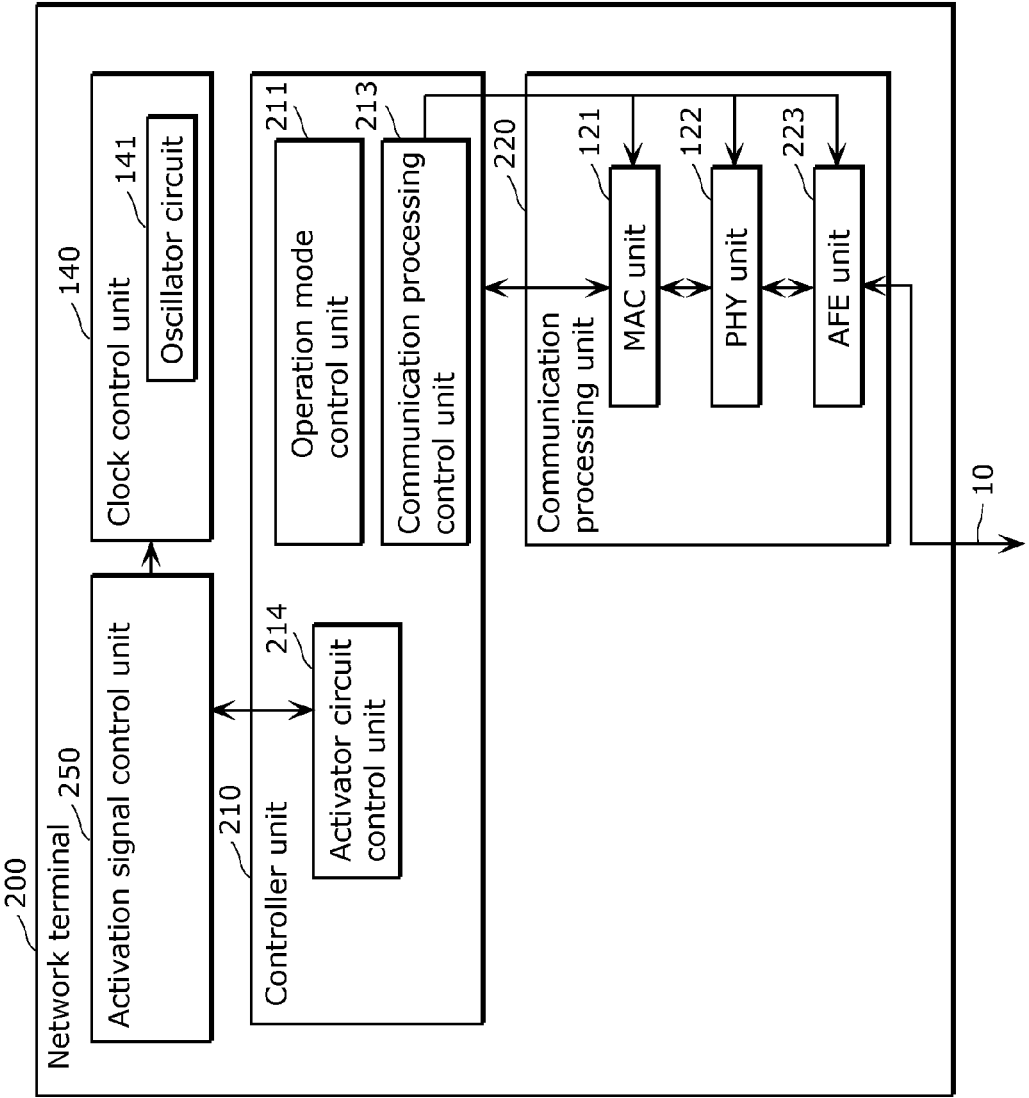
FIG. 8 is a block diagram showing a schematic structure of a network terminal according to Embodiment 2 of the present disclosure.

FIG. 8 is a block diagram showing a schematic structure of a network terminal 200 according to Embodiment 2 of the present disclosure. It is to be noted that the same structural elements as in FIG. 1 are assigned with the same numerical references, and detailed descriptions thereof are not repeated here.

The network terminal 200 shown in FIG. 8 includes a communication processing unit 120, a clock control unit 140, a controller unit 210, and an activation signal control unit 250.

Unlike the network terminal 100 shown in FIG. 1, the network terminal 200 shown in FIG. 8 does not include any unit corresponding to the signal detecting unit, but includes an activation signal control unit 250. In addition, the network terminal 100 has the controller 210 and a communication processing unit 220 each of which is configured differently from the corresponding unit shown in FIG. 1.

The controller unit 210 changes the waveform or the frequency of the wave detection signal to be transmitted by the communication processing unit 220, and thereby causes the communication processing unit 220 to transmit the wave detection signal which can be detected by a particular one (the network terminal 100 or the like) of other network terminals. In addition, after start of supply of the clock generated by the oscillator circuit 141, the controller unit 110 performs operation mode control on the network terminal 100 according to the activation signal so that the network terminal 100 transitions from a stop mode in which the oscillator circuit 141 is at least stopped to a normal operation mode in which the oscillator circuit 141 operates and communication data can be transmitted and received. In addition, in the case where no communication data is communicated over a certain period of time when the network terminal 100 is in a normal operation mode, the controller unit 110 performs operation mode control on the network terminal 100 so that the network terminal 100 transitions to a waiting mode such as a stop mode or a non-stop mode. In addition, the controller unit 110 performs operation mode control on the network terminal 100 so that the network terminal 100 transitions to the waiting mode such as the stop mode or the non-stop mode in the case where the controller unit 110 receives a data signal showing a transition request for the network terminal 100 in the normal operation mode from an other network terminal connected through the transmission path 10.

More specifically, the controller unit 210 does not include any detector circuit control unit, but includes an operation mode control unit 211, a communication processing control unit 213, and an activator circuit control unit 214.

The operation mode control unit 211 switches operation modes of the network terminal 200, based on the activation signal output from the activation signal control unit 250 and the communication data received through the transmission path 10. As in Embodiment 1, the network terminal 200 also performs the normal operation mode and the waiting modes which are the stop mode and the non-stop mode.

More specifically, for the communication processing unit 220, the communication processing control unit 213 performs, through the transmission path 10, various kinds of initial settings, generation of data to be transmitted, and analysis of the data received through the transmission path. The initial settings are for setting address information etc. of the network terminal 200 and the network terminal 100 etc. necessary for communication with the network terminal 100 etc., and conditions for signals whose waveforms are detectable by the network terminal 100 etc. In addition, the communication processing control unit 213 controls a switch of a communication waveform (a signal amplitude or a carrier wave frequency) or a frame length of the wave detection signal to be transmitted.

The activator circuit control unit 214 sets, for the activation signal control unit 250, an activation condition which is a condition for activating the activation signal control unit 250. In addition, the activator circuit control unit 214 analyzes the activation signal output by the activation signal control unit 250.

It is to be noted that the controller unit 210 may include a RAM, a ROM, and/or the like as necessary as in Embodiment 1. In addition, the details of the initial settings performed by the controller unit 210 may be shared in advance with the network terminal 100 etc. by communication through the transmission path 10. In this case, the communication processing control unit 213 may store the initial settings in the communication processing control unit 213, the RAM, ROM, and/or the like as necessary.

The communication processing control unit 213 is an example of communication processing units according to the present disclosure, and transmits a wave detection signal to the network terminal 100 etc. connected through the transmission path 10. For example, the communication processing unit 220 includes a D/A converter (DAC) as a transmitter circuit, and changes the signal amplitude or the carrier wave frequency of the wave detection signal to be transmitted by the communication processing unit 220 by means of the controller unit 210 changing an input value to the DAC. In addition, for example, the communication processing unit 220 includes an amplifier (AMP) circuit as a transmitter circuit, and changes the signal amplitude of the wave detection signal to be transmitted by the communication processing unit 220 by means of the controller unit 210 changing an amplitude rate of the AMP circuit. In addition, for example, the communication processing unit 220 includes a sine wave generator circuit as a transmitter circuit, and changes the carrier wave frequency of the wave detection signal to be transmitted by the communication processing unit 220 by means of the controller unit 210 changing a frequency of the sine wave generator circuit.

More specifically, the communication processing unit 220 includes a MAC unit 121, a PHY unit 122, and an AFE unit 223.

The AFE unit 223 includes, a digital-to-analog converter (DAC), an analog-to-digital converter (ADC), and/or the like, and performs formation of a transmission waveform and digital coding of a received signal. Here, the AFE unit 223 may include, for example, a sine wave oscillator. In this case, the AFE unit 223 generates and detects the transmission waveform. In addition, the AFE unit 223 may include, for example, an AMP circuit. In this case, the AFE unit 223 amplifies transmitted and received signals. In addition, the AFE unit 223 may include, for example, a filter circuit. In this case, the AFE unit 223 amplifies transmitted and received signals. Settings for the AFE unit 223 are performed by the controller unit 210 as described above.

According to an instruction by the activation signal control unit 250 or the operation mode control unit 211, the clock control unit 140 changes a clock frequency to be supplied to the controller unit 210, the communication processing unit 220, and the activation signal control unit 250, and performs ON/OFF control on the clock supply.

The activation signal control unit 250 is an example of activation control units according to the present disclosure, and generates an activation signal independently. The activation signal control unit 250 includes an external interrupt circuit, a timer, a serial interface, or a sensor IF circuit, and generates an activation signal triggered by one of an input signal, an end of a timer count, an ambient temperature, or a vibration from outside.

More specifically, the activation signal control unit 250 generates an activation signal for transitioning from a waiting mode in which electric power consumption is small and the normal operation mode in which a communication process can be performed. The activation signal control unit 250 includes, for example, the sensor IF circuit such as an ADC, and generates an activation signal using as trigger information such as an ambient temperature. Here, for example, the activation signal control unit 250 may include an interrupt circuit or a serial circuit. In this case, the activation signal control unit 250 generates an activation signal using as a trigger an input signal from an external device connected to the network terminal. In addition, the activation signal control unit 250 may include, for example, a timer circuit. In this case, the activation signal control unit 250 may generate an activation signal using as a trigger an end of a timer count, an elapse of a certain time period.

The network terminal 200 is configured as described above.

Next, operations performed by the network terminal 200 are described.

First, the network terminal 200 is subject to initial settings performed by the controller unit 210. More specifically, the communication processing control unit 213 performs initial settings to the communication processing unit 220. Meanwhile, the activator circuit control unit 214 performs initial settings to the communication processing control unit 213.

Here, the details of the initial settings may be shared in advance with the network terminal 100 etc. connected through the communication path 10. In this case, the communication processing control unit 213 may store the initial settings in the communication processing control unit 213, the RAM, ROM, and/or the like as necessary.

Next, the network terminal 200 transmits and receives communication data through the transmission path 10 using a clock generated by the oscillator circuit 141, after the completion of the initial settings.

Next, the network terminal 200 controls a function of the connected network terminal using the clock generated by the oscillator circuit 141.

More specifically, the controller unit 210 switches operation modes of the network terminal 200, based on an input signals (data signal) received from the connected network terminal.

For example, it is assumed that the network terminal 200 received the data signal which shows an instruction for a transition to a waiting mode from the connected network terminal, or that a certain period of time in which no communication is performed was elapsed after the reception of the data signal. In this case, the operation mode control unit 211 causes a transition to a waiting mode in which all the functional elements other than the activation signal control unit 250 are stopped. Here, in the case where an instruction indicates that no clock supply from the activation signal control unit 250 is required, the clock control unit 240 may cause the oscillator circuit 141 to stop operating (to transition to the stop mode). In addition, the clock control unit 240 may switch to a power saving mode (non-stop mode) in which a clock frequency is suppressed, in order to cause only necessary functional elements such as the ADC circuit to operate. In addition, the clock control unit 240 may switch to the non-stop mode for causing the oscillator circuit 141 to provide a slow (low-frequency) clock which does not activate the communication processing unit 120.

Next, when an activation event (trigger) set for the activator circuit control unit 214 occurs, the activation signal control unit 250 generates an activation signal, and outputs it to the clock control unit 140 and the controller unit 210.

Next, the clock control unit 240 causes the oscillator circuit 141 to start oscillating according to the activation signal, and changes the frequency of the clock provided by the oscillator circuit 141 to a frequency which allows the network terminal to perform a communication process.

Next, the operation mode control unit 211 causes the network terminal 100 to transition to the normal operation mode. In addition, the activator circuit control unit 214 analyzes the output activation signal, and determines an address of a destination terminal when communication with the connected network terminal is necessary.

Next, based on the details of the initial settings, the communication processing control unit 213 performs settings of a signal amplitude, a carrier wave frequency, and a frame length for the communication processing unit 220 so that the identified destination terminal can output a detection wave signal having a waveform detectable by the identified destination terminal. Next, the communication processing unit 220 transmits a wave detection signal for causing the destination network terminal to return from the waiting mode.

In this way, the network terminal 200 including the activation signal control unit 250 normally remains in the waiting mode using a small electric power, and transitions to the normal operation mode in which a communication process can be performed when a communication event occurs. In addition, the network terminal 200 transmits the wave detection signal for causing the particular network terminal to transition to the normal operation mode, and thereby causing the particular network terminal to return from the waiting mode via a network.

Unlike the network terminal 100 according to Embodiment 1, the network terminal 200 does not include any signal detecting unit, and thus does not transition to the normal operation mode in response to a communication signal. However, with the activation signal control unit 250, the network terminal 200 provides an advantageous effect of being able to transition to the normal operation mode using a vibration or the like as a trigger.

Variation

The network terminal 200 according to Embodiment 2 capable of transmitting a wave detection signal for causing a connected network terminal to return from the waiting mode does not include any signal detecting unit. However, this is a non-limiting example. Hereinafter, the example is described.

Figure 9:
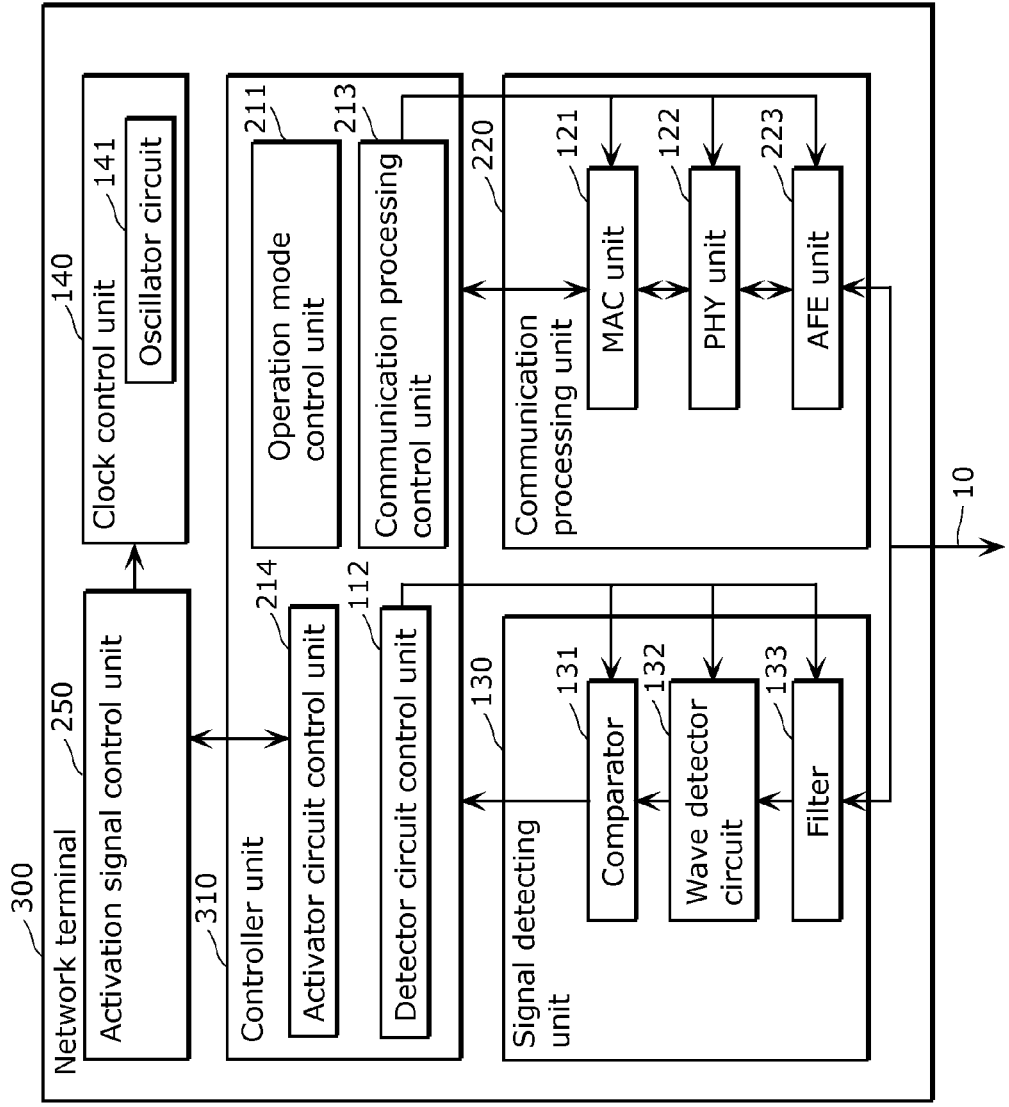
FIG. 9 is a block diagram showing a schematic structure of a network terminal in a variation of Embodiment 2.

FIG. 9 is a block diagram showing a schematic structure of a network terminal 300 in this variation of Embodiment 2. It is to be noted that the same structural elements as in FIGS. 1 and 8 are assigned with the same numerical references, and detailed descriptions thereof are not repeated here.

The network terminal 300 shown in FIG. 9 is different from the network terminal 200 shown in FIG. 8 in the points of additionally including a signal detecting unit 130 shown in FIG. 1 and a detector circuit control unit 112 in a controller unit 310.

In other words, the network terminal 300 is a network terminal capable of transmitting a wave detection signal for causing a connected network terminal (such as a network terminal 100) to return from a waiting mode, and additionally includes an element for detecting the wave detection signal from the network terminal 100.

In this embodiment as in Embodiment 1, the controller unit 310 changes a circuit constant for the signal detecting unit 130. However, the circuit constant of the signal detecting unit 130 may be changed according to a data signal or the like from the network terminal connected through the transmission path 10, instead of being changed by the controller unit 310.

Embodiment 3

Embodiment 3 describes a network system 1000 to which the network terminals described in Embodiments 1 and 2 are connected through a transmission path.

Figure 10:
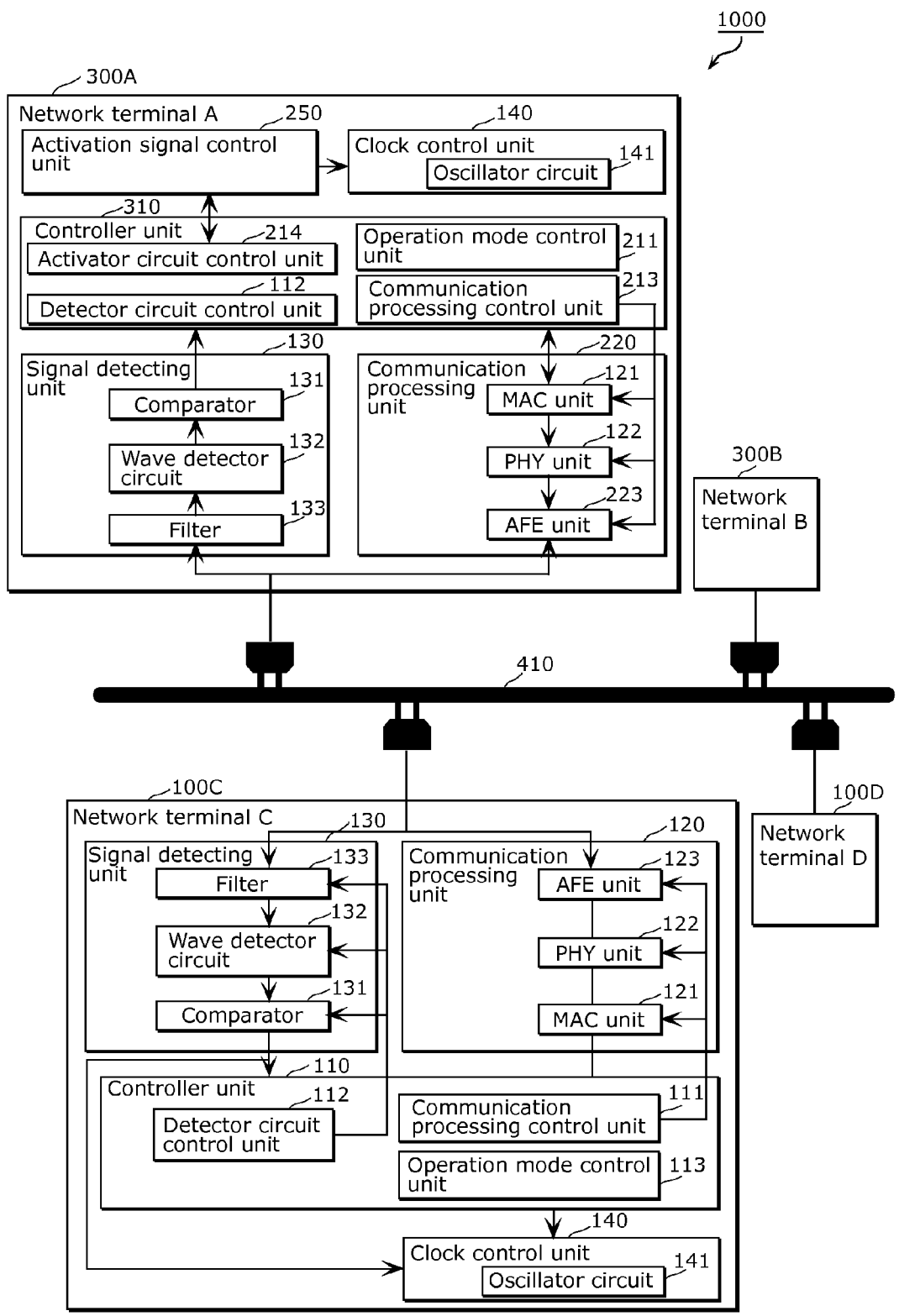
FIG. 10 is a block diagram showing a schematic structure of a network system according to Embodiment 3 of the present disclosure.

FIG. 10 is a block diagram showing a schematic structure of the network system 1000 according to Embodiment 3 of the present disclosure. It is to be noted that the same structural elements as in FIGS. 1, 8, and 9 are assigned with the same numerical references, and detailed descriptions thereof are not repeated here.

The network system 1000 shown in FIG. 10 includes an electric power line 410 as the transmission path, and a plurality of network terminals including the above terminals connected through the electric power line 410.

The plurality of network terminals include, for example as shown in FIG. 10, a network terminal 300A, a network terminal 300B, a network terminal 100C, and a network terminal 100D.

Here, each of the network terminal 100C and the network terminal 100D corresponds to the network terminal 100 according to Embodiment 1. In other words, each of the network terminal 100C and the network terminal 100D includes a controller unit 110, a communication processing unit 120, a signal detecting unit 130, and a clock control unit 140.

In addition, each of the network terminal 300A and the network terminal 300I3 corresponds to the network terminal 300 in the variation of Embodiment 2. In other words, each of the network terminal 300A and the network terminal 300B includes a signal detecting unit 130, a clock control unit 140, an activation signal control unit 250, a controller unit 310, and a communication processing unit 220.

Here, the network terminal 300A and the network terminal 300B may cause both or one of the signal detecting unit 130 and the activation signal control unit 250 to start operating as a condition for returning from a waiting mode, at an end of the waiting mode.

In such a manner, the network system 1000 is configured.

More specifically, the network system 1000 is a network system including the plurality of network terminals which communicate through the electric power line.

Each of the network terminals includes: an oscillator circuit which generates a clock; the communication processing unit configured to transmit and receive communication data through a power line 410, using the clock; the controller unit configured to control a function of the network terminal, using the clock generated by the oscillator circuit; the clock control unit configured to cause the oscillator circuit to start or stop oscillating, and supply the clock generated by the oscillator circuit to the communication processing unit and the controller unit; and a signal detecting unit configured to monitor a wave detection signal communicated through the power line in the case where the communication processing unit is not operating when, for example, the oscillator circuit does not operate, and generate an activation signal according to which the clock control unit causes the oscillator circuit to start oscillating at a time when the wave detection signal exceeds a threshold value. The signal detecting unit includes a circuit operable without using a clock, and the controller unit changes a circuit constant of the signal detecting unit, and switches a wave detection signal which is detectable by the signal detecting unit.

In addition, at least one of the plurality of network terminals further includes independently an activation signal control unit which generates an activation signal. The activation signal control unit includes an external interrupt circuit, a timer, a serial interface, or a sensor IF circuit, and generates an activation signal triggered by one of an input signal, an end of a timer count, an ambient temperature, or a vibration from outside. The communication processing unit transmits a wave detection signal to the network terminals connected through the electric power line. The controller unit switches a waveform or a frequency of the wave detection signal to be transmitted by the communication processing unit to a frequency or a frequency detectable by a particular network terminal among the network terminals, and causes the communication processing unit to transmit the wave detection signal to the particular network terminal.

Although the network system 1000 in FIG. 10 includes the network terminals 300 (specifically 300A and 300B) and the network terminals 100 (specifically 100C and 100D) in FIG. 10, such a configuration is a non-limiting example. The number of network terminals is not limited on condition that one of the network terminals 300A and 300B and one of the network terminals 100C and 100D are included.

Alternatively, the network system 1000 as shown in FIG. 10 may include a network terminal 200 shown in FIG. 8 instead of one of the network terminals 300.

Alternatively, the network system 1000 as shown in FIG. 10 may replace the network terminals 100 with additional network terminals 300, that is, may include only the original and additional network terminals 300.

As described above, it is possible to realize the network system 1000 including the plurality of network terminals which consume very little electric power during a waiting mode. In other words, the network system 1000 is a system in which very little electric power is consumed in a waiting mode and which causes a particular one of the network terminals connected thereto through the transmission path to return from the waiting mode as the need arises.

In this way, it is possible to approximate electric power to be used for the network terminals during the waiting mode to zero as much as possible, and to cause only the particular terminal to return from the waiting mode through the network.

Here, each of the network terminals may include a device for embedding the network system 1000, and a functional unit for device control.

For example, the network system 1000 can be mounted on a power-assisted bicycle, to be used to control parts of the bicycle. In this case, it is only necessary to provide, in each of network terminals, a functional unit for performing switch control for turning on light and a speed change gear. In addition, for example, in the case of providing each network terminal with a robot in the network system 1000, it is only necessary to provide a functional unit for controlling hand and foot parts etc. of the robot.

Next, descriptions are given of operations performed by the network system 1000 configured as describe above.

First, each of the network terminals performs initial settings of address information thereof to the communication processing unit 120 and a communication processing unit 320.

In other words, the network terminals 100C and 100D performs initial settings using the controller unit 110, and the network terminals 300A and the network terminal 300B performs initial settings using the controller unit 310.

More specifically, in each of the network terminals 100C and 100D, the communication processing control unit 113 performs the initial settings of the address information of the terminal itself to the communication processing unit 120, and the detector circuit control unit 112 sets, for each network terminal to be connected to the electric power line 410, a condition for a signal detectable by the network terminal.

More specifically, in each of the network terminals 300A and 300B, the communication processing control unit 213 performs the initial settings of the address information of the terminal itself to the communication processing unit 220, and the detector circuit control unit 112 sets, for each network terminal to be connected to the electric power line 410, a condition for a signal detectable by the network terminal. The activator circuit control unit 214 sets an activation condition for the activation signal control unit 250.

Here, descriptions are given of examples of conditions for signals detectable by the respective network terminals.

FIGS. 11A and 11B are diagrams showing signal conditions which are set to the respective network terminals. In other words, as shown in FIGS. 11A and 11B, for each of the network terminals, a voltage condition (reference voltage value) for a wave detection signal, a frequency condition fA for the wave detection signal, a voltage condition (amplitude value) for a data signal, and a carrier wave condition (frequency).

More specifically, for the network terminal 300A, an amplitude value VA and a frequency fA or lower are set as such conditions for the wave detection signal detectable by the network terminal 300A. For the network terminal 300B, an amplitude value VB and a frequency fB or lower are set as such conditions for the wave detection signal detectable by the network terminal 300B. For the network terminal 300B, an amplitude value VB and a frequency fB or lower are set as such conditions for the wave detection signal detectable by the network terminal 300B. For the network terminal 100C, an amplitude value VC and a frequency fC or lower are set as such conditions for the wave detection signal detectable by the network terminal 100C. For the network terminal 100D, an amplitude value VD and a frequency fD or lower are set as such conditions for the wave detection signal detectable by the network terminal 100D. On the other hand, for all the network terminals, an amplitude value Vcom and a frequency from are set as the conditions for the data signal detectable by the network terminals. Here, the voltage value Vcom is larger than the amplitude values VA to VD, and the frequency from is smaller than the frequencies fA to fD.

FIGS. 12A and 12B are diagrams showing signal conditions which are set to the respective network terminals. More specifically, for the network terminal 300A, an amplitude value V1 and a frequency f1 or lower are set as such conditions for the wave detection signal detectable by the network terminal 300A. More specifically, for the network terminal 300B, an amplitude value V1 and a frequency f2 or lower are set as such conditions for the wave detection signal detectable by the network terminal 300B. More specifically, for the network terminal 100C, an amplitude value V2 and a frequency f3 or lower are set as such conditions for the wave detection signal detectable by the network terminal 100C. More specifically, for the network terminal 100D, an amplitude value V3 and a frequency f3 or lower are set as such conditions for the wave detection signal detectable by the network terminal 100D. On the other hand, for all the network terminals, an amplitude value V3 and a frequency f1 are set as the conditions for the data signal detectable by the network terminals. However, the voltage value V3 is larger than the amplitude values V1 and V2, and the amplitude value V1 is larger than the amplitude value V2 (V1>V2>V3). In addition, the frequency f3 is smaller than the frequencies f1 to f2, and the frequency f2 is smaller than the frequency f1 (f1>f2>f3).

Here, after the completion of the initial settings, each network terminal communicates the details of the initial settings to at least the network terminals 300A and 300B connected through the electric power line 410. For this reason, at least the network terminals 300A and 300B register the details of the initial settings shown in FIG. 1A to FIG. 12B.

In this way, the communication processing unit 220 of at least each of the network terminals 300A and 300B can transmit, for example, a wave detection signal to the particular network terminal as shown in FIG. 12A. In addition, each of the network terminals transmits the data signal according to the signal conditions shown in FIG. 12B.

In this way, each network terminal transmits and receives communication data through the electric power path 410, using a clock generated by the oscillator circuit 141, after the completion of the initial settings.

Next, each network terminal controls functions thereof using the clock generated by the oscillator circuit 141.

For example, the operation mode control unit 111 in each of the network terminals 100C and 100D, transitions an operation mode thereof to a stop mode. In addition, the operation mode control unit 211 in each of the network terminals 300A and 300B transitions an operation mode thereof to a waiting mode according to the details of an operation performed by the activator signal control unit 250.

Next, for example, when the activation signal control unit 250 has an activation event in the network terminal 300A, the controller unit 310 transitions the waiting mode of the network terminal 300A to a normal operation mode, based on the activation signal generated by the activation signal control unit 250.

In addition, the activator circuit control unit 214 analyzes the activation signal generated by the activation signal control unit 250, and determines the need of communication with the network terminal 100D as a result of the analysis. In this case, in the network terminal 300A, the communication processing control unit 213 causes the communication processing unit 220 to transmit a wave signal having settings of an amplitude value of V3 or larger and smaller than V2 and a carrier wave frequency f3 to the network terminal 100D so as to cause the network terminal 100D to return from the waiting mode.

Next, the network terminal 100D returns after monitoring the wave detection signal.

More specifically, the settings for the network terminals 300B and 100C do not allow detection of a signal having an amplitude value of V2 or smaller, and thus only the signal detecting unit 130 of the network terminal 100D can detect the wave detection signal from the network terminal 300A. In other words, in response to the wave detection signal, the network terminal 100D generates an activation signal and transitions (returns) from the waiting mode to the normal operation mode, based on the generated activation signal.

Next, the network terminal 300A outputs a transmission waveform of a data signal, and performs data communication with the network terminal 100D.

More specifically, the communication processing control unit 213 transmits, to the network terminal 100D, the data signal having settings of an amplitude value V3 and a carrier wave frequency of f1, and thereby performs the data communication with the network terminals 300A and 100D.

In this way, although a data signal in a normal operation mode is common to all the network terminals, the wave detection signal does not match the signal detection conditions set for the network terminals 300B and 100C, and thus the network terminals 300B and 100C can remain in a waiting mode even while the network terminals 300A and 100D keep communicating data with each other.

Next, after the completion of the data communication with the network terminal 100D, the network terminal 300A transmits, for example, a data signal indicating the end of the communication to the network terminal 100D, in this way, the network terminal 300A can transition from the operation mode to the waiting mode after the transmission of the data signal indicating the end of the communication, and the network terminal 100D can transition to the waiting mode after the reception of the data signal indicating the end of the communication.

In this way, the network terminal 300A or 300B identifies a target network terminal to be caused to return from the waiting mode via the electric power line 410, according to the details of the activation signal generated by the activation signal control unit 250. Next, the network terminal 300A or 300B outputs a wave detection signal according to the conditions for the detector circuit of the identified network terminal. Upon receiving the wave detection signal, the identified network terminal can detect the wave detection signal according to the signal detection conditions initially set and stored, and return from the waiting mode.

Although only one particular network terminal returns in the above described example, the example is a non-limiting one. In the case where there is a need to perform communication with a plurality of network terminals, it is also possible to cause all of the target network terminals to return at the same time by transmitting a wave detection signal having conditions which allow the target network terminals to detect the wave detection signal.

In addition, the voltage conditions and frequency conditions for the wave detection signals shown in FIG. 12A are non-limiting specific examples, FIGS. 13 and 14 show examples having different conditions for the wave detection signals which are set initially to the network terminals.

As shown in FIG. 13, the same initial conditions may be set to each of the network terminals 100C and 100D, and different initial settings may be set to the network terminals 300A and 300B. Here, for example, V4>V1>V2>V3, and f1>f2>f3>f4.

In addition, as shown in FIG. 14, initial settings which are set for the network terminals may be different from terminal to terminal. Here, for example, V5>V4>V2>V1>V3, and f1>f2>f3>f4>5.

As described above, according to the present disclosure, it is possible to realize the network terminal which consumes very little electric power in the waiting mode, the method for controlling the same, and the network system including the same.

For example, it is possible to keep a state in which a network terminal or an entire network system consumes very little electric power in a waiting mode in which no communication is performed. For example, even when a data communication event arises in a network system, it is possible to selectively cause only a target network terminal to return from a waiting mode without causing a return of a terminal unrelated to the data communication. In this way, it is possible to provide an advantageous effect of being able to realize an effective power control in the entire network system.

Although the network terminal, the method for controlling the same, and the network system including the same have been described based on the embodiments, the present disclosure is not limited to these embodiments. Those skilled in the art will readily appreciate that various modifications may be made in these exemplary embodiments and other embodiments may be made by arbitrarily combining structural elements of different embodiments disclosed or substantially disclosed herein without materially departing from the principles and spirit of the inventive concept, the scope of which is defined in the appended Claims and their equivalents. Accordingly, all such modifications and embodiments are intended to be included within the scope of the present disclosure.

For example, the present disclosure encompasses such embodiments realized as an integrated circuit including the processing units of the network terminal, a method having the steps corresponding to the processing units of the network terminal, or other implementations.

INDUSTRIAL APPLICABILITY

The non-limiting exemplary embodiments disclosed herein are generally applicable to network terminals, methods for controlling the same, and network systems including the same. More specifically, each of the non-limiting exemplary embodiments involves a unique waiting control function using a network, for allowing some of network terminals in a network system to remain in a communication waiting mode in which very little electric power is consumed until a communication event occurs, and thus particularly applicable to network systems for waiting control on, for example, a power-assisted bicycle or a robot which has a limitation in electric power consumption and has comparatively few communication opportunities.

The invention claimed is:

1. A network terminal which performs communication through a transmission path, comprising:
   an oscillator circuit which generates a clock;
   a communication processing unit configured to transmit and receive communication data through the transmission path, using the clock;
   a controller unit configured to control a function of the network terminal, using the clock;
   a clock control unit configured to cause the oscillator circuit to start or stop oscillating, and supply the clock generated by the oscillator circuit to the communication processing unit and the controller unit; and
   a signal detecting unit configured to monitor a wave detection signal communicated through the transmission path in a case where the communication processing unit is not operating, and generate an activation signal according to which the clock control unit causes the oscillator circuit to start oscillating at a time when the wave detection signal exceeds a threshold value,
   wherein the signal detecting unit is configured with a circuit operable without using the clock, and
   the controller unit is configured to switch a wave detection signal detectable by the signal detecting unit, by changing a circuit constant of the signal detecting unit.

2. The network terminal according to claim 1, wherein the case where the communication processing unit is not operating is a case where the oscillator circuit is at least stopped.

3. The network terminal according to claim 2, wherein the signal detecting unit is configured to output the activation signal to the clock control unit and the controller unit,
   the clock control unit is configured to cause, according to the activation signal, the oscillator circuit to start oscillating, and supply the clock generated by the oscillator circuit to the communication processing unit and the controller unit, and
   after start of supply of the clock, the controller unit is configured to perform operation mode control on the network terminal according to the activation signal so that the network terminal transitions from a stop mode to a normal operation mode, the stop mode being an operation mode in which the oscillator circuit is at least stopped, the normal operation mode being an operation mode in which the oscillator circuit operates and the communication data can be communicated.

4. The network terminal according to claim 3, wherein the controller unit is configured to perform operation mode control for causing the network terminal to transition to the stop mode in the case where no communication data has been transmitted or received over a certain period of time in the normal operation mode.

5. The network terminal according to claim 3, wherein the controller unit is configured to perform operation mode control for causing the network terminal to transition to the stop mode or a power saving mode in the case where the controller unit receives, in the normal operation mode, a data signal indicating a transition request from an other one of the network terminals connected through the transmission path, the transition request requesting that the network terminal transition to the waiting mode.

6. The network terminal according to claim 1, wherein the case where the communication processing unit is not operating is a case where the oscillator circuit at least keeps generating a low-frequency dock which does not activate the communication processing unit.

7. The network terminal according to claim 6, wherein the signal detecting unit is configured to output the activation signal to the clock control unit and the controller unit,
   the clock control unit is configured to cause, according to the activation signal, the oscillator circuit to start generating a clock having a frequency at which at least the communication processing unit is operable, and supply the clock generated by the oscillator circuit to the communication processing unit and the controller unit, and after start of supply of the clock, the controller unit is configured to perform operation mode control on the network terminal according to the activation signal so that the network terminal transitions from a waiting mode to a normal operation mode, the waiting mode being an operation mode in which the oscillator circuit at least keeps generating the low-frequency clock which does not activate the communication processing unit, the normal operation mode being an operation mode in which the oscillator circuit operates and the communication data can be communicated.

8. The network terminal according to claim 1, wherein the signal detecting unit includes a comparator which is configured with a circuit operable without using the clock, and compares the wave detection signal with the threshold value to determine whether the wave detection signal exceeds the threshold value or not, and the controller unit is configured to switch a wave detection signal detectable by the signal detecting unit, by changing a threshold voltage to be provided to the comparator so as to change the threshold value.

9. The network terminal according to claim 1, wherein the signal detecting unit includes;

a wave detector circuit which is configured with a circuit operable without using the clock, and detects the wave detection signal; and a comparator which is configured with a circuit operable without using the clock, and compares the wave detection signal with the threshold value to determine whether the wave detection signal exceeds the threshold value or not, and the controller unit is configured to switch a wave detection signal detectable by the signal detecting unit, by changing charge and discharge characteristics of the wave detector circuit.

10. The network terminal according to claim 1, wherein the signal detecting unit includes;

a wave detector circuit which is configured with a circuit operable without using the clock, and detects the wave detection signal;

a comparator which is configured with a circuit operable without using the clock, and compares the wave detection signal with the threshold value to determine whether the wave detection signal exceeds the threshold value or not; and a filter circuit which is configured with a circuit operable without using clock, and has a filter characteristic of allowing a signal having a predetermined frequency to pass through, and the controller unit switches a wave detection signal detectable by the signal detecting unit by changing the filter characteristic of the filter circuit.

11. The network terminal according to claim 1, the network terminal further comprising an activation signal control unit configured to generate the activation signal independently, wherein the activation signal control unit:

includes one of an external interrupt circuit, a timer, a serial interface, and a sensor IF circuit; and is configured to generate the activation signal triggered by one of an input signal from an external device, an end of a count by the timer, an ambient temperature, and a vibration, the communication processing unit is configured to transmit, through a transmission path, a wave detection signal to other network terminals connected through the transmission path, and the controller unit is configured to cause the communication processing unit to transmit the wave detection signal which is detectable by a particular one of the other network terminals, by changing a waveform or a frequency of the detection signal transmitted by the communication processing unit.

12. The network terminal according to claim 11, wherein the communication processing unit includes a D/A converter as a transmitter circuit, and the controller unit is configured to change a signal amplitude or a carrier wave frequency of the wave detection signal to be transmitted by the communication processing unit, by changing an input value to the D/A converter.

13. The network terminal according to claim 11, wherein the communication processing unit includes an amplifier (AMP) circuit as a transmitter circuit, and the controller unit is configured to change the signal amplitude of the wave detection signal to be transmitted by the communication processing unit, by changing an amplitude rate of the AMP circuit.

14. The network terminal according to claim 11, wherein the communication processing unit includes a sine wave generator circuit as a transmitter circuit, and the controller unit is configured to change a carrier wave frequency of the wave detection signal to be transmitted by the communication processing unit, by changing a frequency of the sine wave generator circuit.

15. The network terminal according to claim 1, wherein the controller unit is further configured to set a condition for a data signal transmittable and receivable by the communication processing unit, to the communication processing unit, the data signal has an amplitude voltage set to be larger than an amplitude voltage of the wave detection signal, and the data signal has a carrier wave frequency set to be smaller than a frequency of the wave detection signal.

16. A network system comprising a plurality of network terminals which perform communication through the transmission path, each of the network terminals including:

an oscillator circuit which generates a clock;

a communication processing unit configured to transmit and receive communication data through the transmission path, using the clock;

a controller unit configured to control a function of the network terminal, using the clock;

a clock control unit configured to cause the oscillator circuit to start or stop oscillating, and supply the clock generated by the oscillator circuit to the communication processing unit and the controller unit; and a signal detecting unit configured to monitor a wave detection signal communicated through the transmission path in a case where the communication processing unit is not operating, and generate an activation signal according to which the clock control unit causes the oscillator circuit to start oscillating at a time when the wave detection signal exceeds a threshold value, wherein the signal detecting unit is configured with a circuit operable without using the clock, and the controller unit is configured to switch a wave detection signal detectable by the signal detecting unit, by changing a circuit constant of the signal detecting unit, and at least one of the plurality of network terminals further including:

an activation signal control unit configured to generate the activation signal independently, wherein the activation signal control unit:

includes one of an external interrupt circuit, a timer, a serial interface, and a sensor IF circuit; and is configured to generate the activation signal triggered by one of an input signal from an external device, an end of a count by the timer, an ambient temperature, and a vibration, the communication processing unit is configured to transmit, through a transmission path, a wave detection signal to other network terminals connected through the transmission path, and the controller unit is configured to cause the communication processing unit to transmit the wave detection signal which is detectable by a particular one of the other network terminals, by changing a waveform or a frequency of the detection signal transmitted by the communication processing unit.

17. A method of controlling a network terminal including an oscillator circuit which generates a clock and communicates through a transmission path, the method comprising:

transmitting and receiving communication data through the transmission path, using the clock;

controlling a function of the network terminal, using the clock;

causing the oscillator circuit to start or stop oscillating, and supplying the clock generated by the oscillator circuit; and monitoring a wave detection signal communicated through the transmission path in a case where the communication processing unit is not operating, and generating an activation signal according to which the oscillator circuit is caused to start oscillation at a time when the wave detection signal exceeds a threshold value, wherein the monitoring can be performed without using the clock, and in the controlling, a switch of a wave detection signal detectable in the monitoring is performed, by changing a circuit constant as a function of the network terminal.

* * * * *